(12) United States Patent
Beyrak et al.

(10) Patent No.: US 6,789,570 B2
(45) Date of Patent: Sep. 14, 2004

(54) HYDRAULIC VALVE WITH A POSITION SENSOR

(75) Inventors: Yakov Beyrak, Glenview, IL (US); James C. Shader, Oak Lawn, IL (US)

(73) Assignee: HydraForce, Inc., Lincolnshire, IL (US)

( * ) Notice: Subject to any disclaimer, the term of this patent is extended or adjusted under 35 U.S.C. 154(b) by 220 days.

(21) Appl. No.: 10/125,020

(22) Filed: Apr. 18, 2002

(65) Prior Publication Data

US 2002/0153045 A1 Oct. 24, 2002

Related U.S. Application Data

(60) Provisional application No. 60/285,808, filed on Apr. 23, 2001.

(51) Int. Cl.[7] .............................................. F16K 37/00
(52) U.S. Cl. ............... 137/554; 137/625.66; 324/207.2; 324/207.24
(58) Field of Search ........................... 137/554, 625.66; 324/207.2, 207.24

(56) References Cited

U.S. PATENT DOCUMENTS

| 4,593,719 | A | * | 6/1986 | Leonard ................. 137/625.66 |
| 4,995,586 | A | | 2/1991 | Gensberger et al. |
| 5,445,188 | A | | 8/1995 | Bourkel et al. |
| 5,484,352 | A | * | 1/1996 | Kuma ........................ 137/554 |
| 5,565,770 | A | * | 10/1996 | Jones ..................... 324/207.24 |
| 6,152,172 | A | * | 11/2000 | Christianson et al. ....... 137/554 |
| 6,199,585 | B1 | | 3/2001 | Reith et al. |
| 6,263,915 | B1 | * | 7/2001 | Hayashi et al. ............. 137/554 |

* cited by examiner

*Primary Examiner*—John Rivell
(74) *Attorney, Agent, or Firm*—Leydig, Voit & Mayer, Ltd.

(57) ABSTRACT

A hydraulic valve with a position sensor is described. According to various implementations, the valve has a cage with a set of radial holes, a spool assembly slideable within the cage, and a sensor, which may be a Hall effect sensor, that reacts to the movement of the spool assembly. In other implementations, the spool comprises one or more of the following: a spool, a pin that is mechanically coupled to the spool, a dampener, which may be a spring, having a first and a second end, the first end being in contact with the pin and the second end being in contact with the spool.

16 Claims, 7 Drawing Sheets

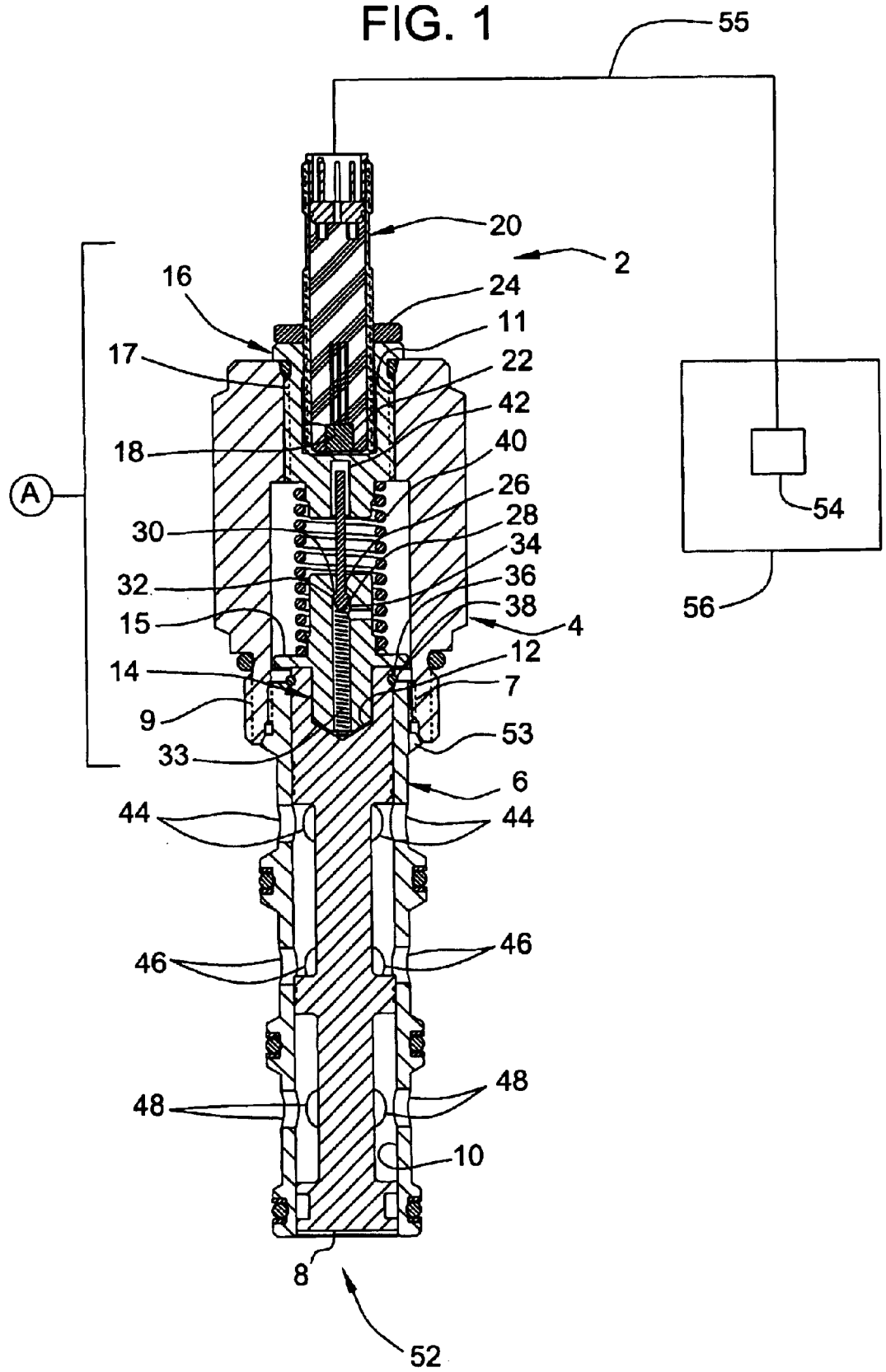

Section B-B

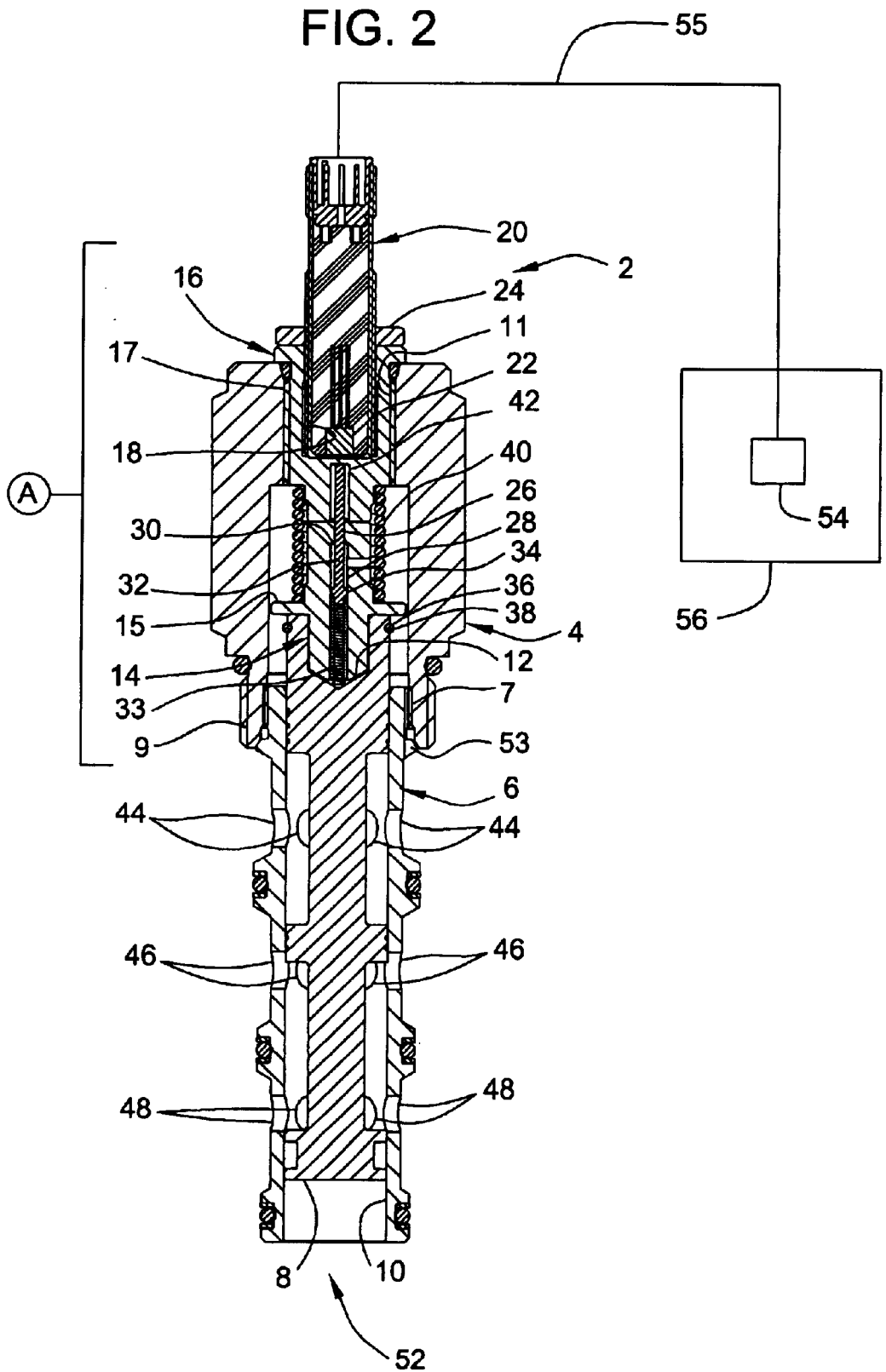

US 6,789,570 B2

HYDRAULIC VALVE WITH A POSITION SENSOR

CROSS REFERENCE TO RELATED APPLICATIONS

This application claims priority to U.S. Provisional Application No. 60/285,808, filed Apr. 23, 2001.

TECHNICAL FIELD

The invention relates generally to hydraulic valves, and, more particularly, to hydraulic valves in which the position of a movable spool or poppet can be detected.

BACKGROUND

Hydraulic valves are used to regulate the flow and pressure of hydraulic fluid in a variety of types of devices, ranging from construction equipment like bulldozers and power shovels to jet aircraft. Many hydraulic valves use a spool or poppet that changes position within the valve to control the amount of hydraulic fluid passing through the valve per unit of time. One challenge in using such valves is determining the current position of the spool or poppet at any given time. Since the spool or poppet is typically located inside the valve and is not visible, the information can be difficult to obtain.

SUMMARY

In accordance with the foregoing, the invention is generally directed to a hydraulic valve with a position sensor. According to various embodiment of the invention, the valve has a cage with a set of radial holes, a spool assembly slideable within the cage, and a sensor, which may be a Hall effect sensor, that provides an electrical signal based on the position of the spool assembly. In more specific embodiments, the spool assembly comprises one or more of the following: a spool, a pin having an enlarged portion and mechanically coupled to the spool and a biasing means, which may be a spring, having a first and a second end, the first end being in contact with the pin and the second end being in contact with the spool.

In other embodiments of the invention, the spool assembly comprises a generally cylindrical guide aligned with the spool and in contact with an end surface of the spool, the guide having a longitudinal hole and at least a portion of the pin being disposed within the longitudinal hole. The spool assembly may also comprise a biasing means disposed within the longitudinal hole, a first end of the biasing means being in contact with the portion of the pin that is disposed within the longitudinal hole and a second end of the biasing means extending out from the longitudinal hole and in contact with the spool. In more specific embodiments, the longitudinal hole of the guide may have a first and a second section, the first section being smaller in diameter than the second section, a circular step of the guide being defined between the first and second sections, wherein, during operation of the valve, the circular step limits the movement of the enlarged portion of the pin to prevent the pin from exiting the longitudinal hole of the guide.

In yet other embodiments of the invention, the valve comprises a spool having a longitudinal blind hold at one end, a portion of a guide being disposed within the longitudinal blind hole, wherein the guide has a collar that is disposed outside of the longitudinal blind hole and is in contact with an end of the spool. The valve may further comprise a plug disposed at an end of the valve, a sensor held stationary by the plug, and a spring annularly disposed around the guide, wherein a first end of the spring abuts the plug and a second end of the spring abuts the annular collar of the guide, wherein the spring pushes the guide and the spool away from the plug.

According to still other embodiments of the invention, a safety system for a hydraulic device, comprises a hydraulic valve that, by itself, comprises: a cage having a set of radial holes for allowing the passage of fluid; a spool slideable within the cage to allow or block the flow of fluid through the set of radial holes, the spool having at least a first position and a second position; a pin coupled to the spool; and a sensor disposed adjacent to the pin, wherein when the spool moves from the first position to the second position, the pin moves relative to the sensor, thereby causing a change in a magnetic field near the sensor, wherein the sensor reacts to the change by generating an electrical signal. The safety system may further comprise a safety circuit electrically connected to the sensor, wherein the safety circuit allows or prevents a user from activating the hydraulic device based on the electrical signal generated by the sensor.

BRIEF DESCRIPTION OF THE DRAWINGS

While the appended claims set forth the features of the invention with particularity, the invention, together with its objects and advantages, may be best understood from the following detailed description taken in conjunction with the accompanying drawings, of which:

FIG. 1 is a cross-sectional view of a hydraulic valve according to an embodiment of the present invention shown in a neutral position;

FIG. 2 is a cross-sectional view of the hydraulic valve of the present invention shown in a shifted position;

DETAILED DESCRIPTION OF THE INVENTION

Figure 1A:
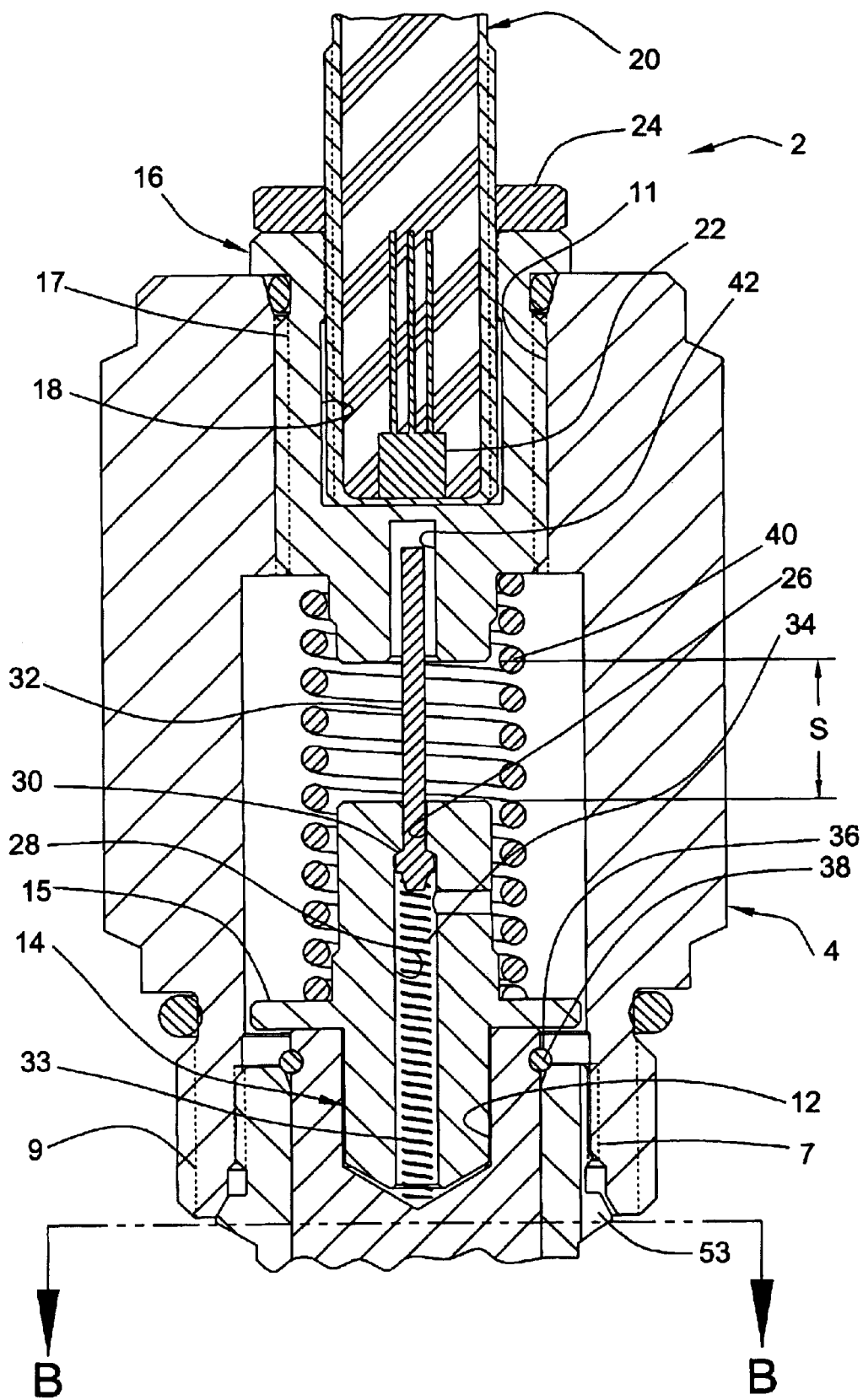
FIG. 1a is an enlarged view of section A of the valve of FIG. 1.

Referring to FIG. 1, a hydraulic valve 2 includes an adaptor 4 and cage 6 connected to each other by engagement between a threaded portion 7 of the cage 6 and a threaded portion 9 of the adaptor 4, and a spool assembly slidable within a bore 10 of the cage 6. The spool assembly comprises a spool 8; a guide 14; a biasing means, shown as being implemented as a spring 33; and a target pin 32. The spool 8 has a longitudinal blind hole 12 with a guide 14 installed therein. The adaptor 4 has a longitudinal threaded through hole 11 with a plug 16 installed therein. The plug 16 has a threaded portion 17 that threadably engages the adaptor 4 in the longitudinal threaded through hole 15. The plug 16 is made from a non-magnetic material, preferably a stainless steel, and has a longitudinal threaded blind hole 18 that threadably engages a sensor 20. The sensor 20 comprises a sensing member 22, which is preferably a Hall Effect sensor.

A lock nut 24 threadably engages the sensor 20 to lock the sensor 20 in a fixed position within the plug 16. The guide 14 has a collar 15 and a two-section longitudinal coaxial hole with a first section 26 being smaller than a second section 28 to provide a circular step 30. A target pin 32, made from a magnetic material, passes through the first section 26 and the second section 28 of the longitudinal hole of the guide 14 with an enlarged portion 34 of the target pin 32 being prevented from exiting out of the second section 28 of the longitudinal coaxial hole by the step 30, and being pushed toward the step 30 by a biasing means, which is shown in FIG. 1 as being implemented as a spring 33 accommodated within the second section 28 of the longitudinal hole of the guide 14 between the enlarged portion 34 of the target pin 32 and the end of the longitudinal blind hole 12 of the spool 8. The spool 8 has a circular groove 36 to accommodate a circular ring 38 limiting movement of the spool 8 in one direction. A bias means, which is shown in FIG. 1 as being implemented as a spring 40, is installed between the guide 14 and the plug 16. The plug 16 has a longitudinal blind hole 42 with a portion of the target pin 32 being accommodated therein. The hole 42 has a small diameter relative to a threaded portion 17 of the plug 16, so that even with a small thickness "T" of a wall between the longitudinal threaded blind hole 18 of the plug 16 and the longitudinal blind hole 42 of the plug 16 (see FIG. 2b), preferably about 0.05 in, the fluid pressure inside the adaptor 4 would not create a sufficient stress in the material of the wall of the plug 16 to break it.

The cage 6 has a first set of radial holes 44, a second set of radial holes 46 and a third set of radial holes 48, with each set of radial holes defining a separate valve port. One end of the bore 10 of the cage 6 defines a valve port 52 used to apply a so-called pilot pressure to shift the spool 8 relative to the cage 6. The cage 6 has a longitudinal groove 53 (also shown in FIG. 1c) passing through the threaded portion 7 of the cage 6 to provide communication between the inside of the adaptor 4 and the first set of radial holes 44 of the cage 6. When the valve 2 is in its neutral position (i.e. the spool 8 is in a neutral position), there is a gap "G" between the end of the longitudinal blind hole 42 of the plug 16 and the target pin 32 and the first set of radial holes 44 communicates with the second set of radial holes 46.

During operation of the valve 2, when a pressure is applied at the port 52, the spool assembly is pushed away from the port 52. Specifically, the spool 8 moves away from the port 52, thereby pushing the spring 33 and the target pin 32 toward the sensing member 22. As the target pin 32 moves, the gap "G" decreases and a magnetic field near said sensing member 22 changes, thereby triggering the sensing member 22. When the sensing member 22 triggers, it generates, depending on the implementation of the sensor 20, either an electrical logical signal "1" (a so-called sourcing output signal), or an electrical logical signal "0" (a so-called sinking output signal). As the spool 8 continues to move further, the target pin 32 eventually stops against the end surface of the longitudinal hole 42 of the plug 16. As the spool 8 continues to move away from the port 52, it pushes the guide 14 and the spring 33, causing the springs 33 and 40 to compress. Since the target pin 32 is stopped against the end surface of the longitudinal hole 42, the distance between the target pin 32 and the sensing member 22 does not change and, thus, the sensing member 22 continues to be in its triggered state.

Figure 1B:
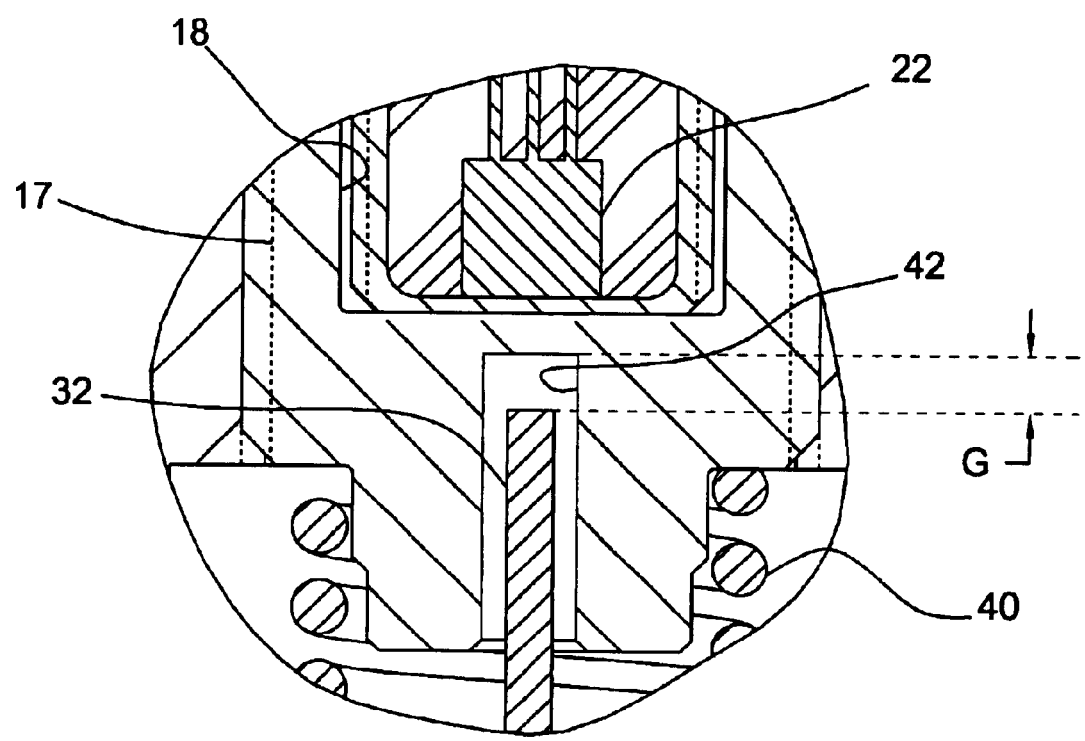
FIG. 1b is an enlarged fragmentary view showing an area near a target pin and a sensor of the hydraulic valve of FIG. 1.
Figure 1C:
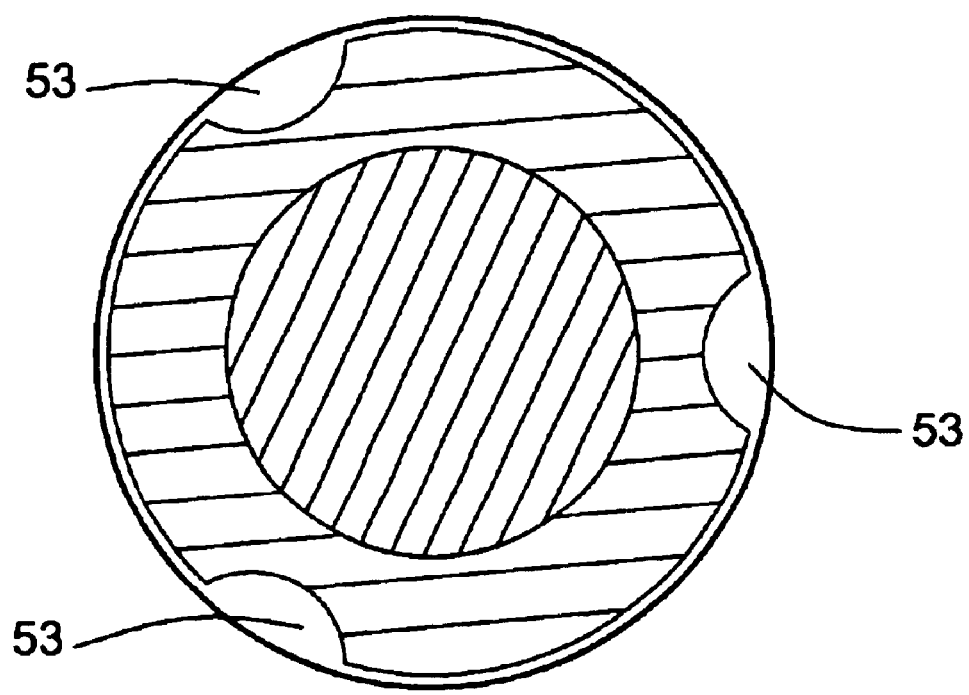
FIG. 1c is a cross-sectional view along line B—B of the hydraulic valve of FIG. 1.
Figure 2A:
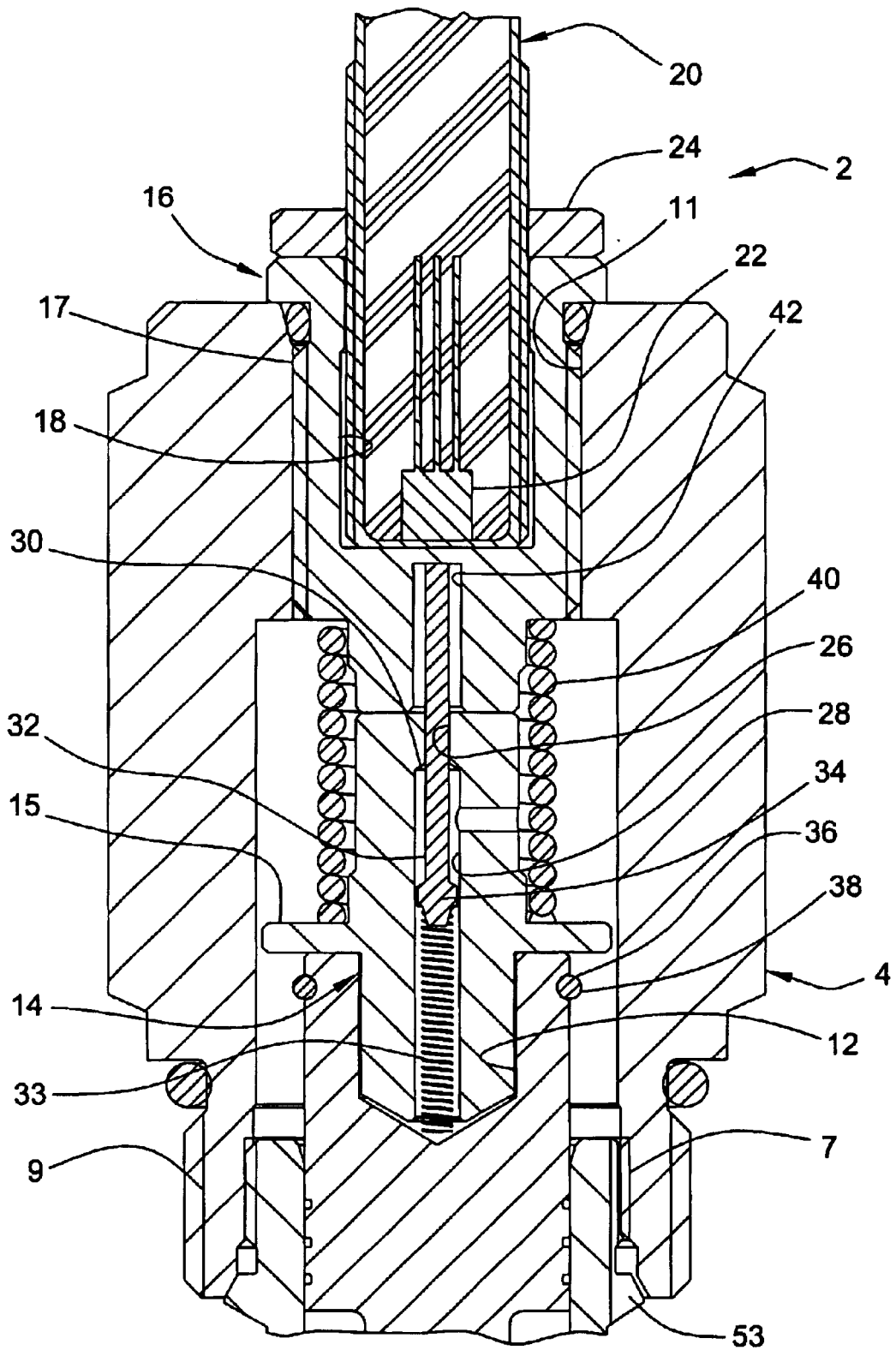
FIG. 2a is an enlarged view of section A of the valve of FIG. 2.
Figure 2B:
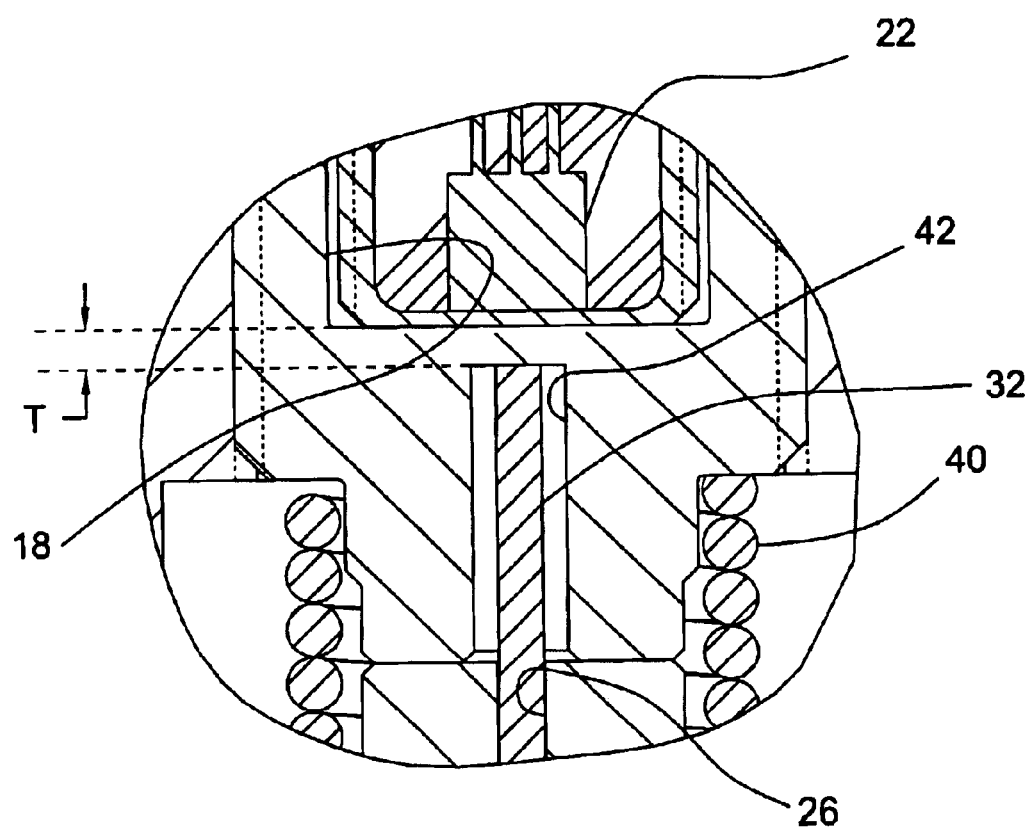
FIG. 2b is an enlarged fragmentary view showing an area near a target pin and a sensor of the hydraulic valve of FIG. 2.

Referring to FIGS. 1a and 1b, the sensitivity with which the position of the spool 8 can be detected generally depends on several factors, including the characteristics of the sensing member 22, the size of the gap "G," and the size of the full stroke "S." While there are many possible values for "S" and "G," setting the maximum size of "G" equal to about 0.03 in and setting "S" equal to about 0.386 in is known to be suitable. If, for example, the maximum size of the gap "G" (i.e. when the target pin 32 is farthest away from the sensing member 22) is selected to be very small, such as about 0.03 in, the sensing member 22 will be triggered and will provide an electrical output signal even when the spool 8 moves a small distance (less than 0.030 in) away from the neutral position. In contrast, if the maximum size of the gap "G" is set so as to be nearly equal to the size of the full stroke "S," then the sensing member 22 will only provide an output signal when the second set of radial holes 46 fully communicates with the third set of radial holes 48.

Referring again to FIG. 1, an example of an application in which the valve 2 may be used will now be described. In this example, the valve 2 is a component of a safety system for a hydraulic device. The sensor 20 is electrically connected by a line 55, which may be a cable or a wire, to a safety circuit 54 of the hydraulic device 56. Furthermore, the logic of the safety circuit 54 is configured so that the hydraulic device 56 is prevented from being activated or performing a certain function unless the valve 2 is determined by the safety circuit 54 to be in a specified position, such as a neutral or a shifted position. The safety circuit determines the position of the valve based on the logical output signal provided by the sensing member 20.

The foregoing detailed description has been for the purpose of illustration only. Thus, a number of modifications and changes may be made without departing from the spirit and scope of the invention. Furthermore, it will be appreciated that the invention is not restricted in its applicability to the two-position, four way, screw-in, spool type valve shown in the figures, but that it is applicable to all other valves in which detecting the spool or poppet position would be useful.

What is claimed is:

1. A hydraulic valve comprising:
   a cage having a set of radial holes for allowing the passage of fluid;
   a spool assembly slideable within the cage to allow or block the flow of fluid through the set of radial holes;
   a sensor disposed adjacent to the spool assembly, wherein when the spool assembly moves relative to the sensor, it causes a change in a magnetic field near the sensor, wherein the sensor reacts to the change by generating an electrical signal;
   wherein the spool assembly comprises a spool and a pin that is mechanically coupled to the spool, the pin being located closer to the sensor than the spool; and
   a biasing means having a first and a second end, the first end being in contact with the pin and the second end being in contact with the spool.

2. The valve of claim 1, wherein the biasing means is a spring.

3. The valve of claim 1, wherein the spool has an end surface, and the spool assembly further comprises:
   a generally cylindrical guide aligned with the spool and in contact with the end surface, the guide having a longitudinal hole, at least a portion of the pin being disposed within the longitudinal hole; and
   wherein the biasing means is disposed within the longitudinal hole, the first end of the biasing means being in contact with the portion of the pin that is disposed within the longitudinal hole, the second end of the biasing means extending out from the longitudinal hole.

4. The valve of claim 3,
wherein the longitudinal hole of the guide has a first and a second sections, the first section being smaller in diameter than the second section, a circular step of the guide being defined between the first and second sections,
wherein the pin has an enlarged portion disposed within the second section, and
wherein, during operation of the valve, the circular step limits the movement of the enlarged portion of the pin to prevent the pin from exiting the longitudinal hole of the guide.

5. The valve of claim 3, wherein the spool has a longitudinal blind hold at one end, a portion of the guide being disposed within the longitudinal blind hole, wherein the guide has a collar that is disposed outside of the longitudinal blind hole and contacts an end of the spool, the valve further comprising:
  a plug disposed at an end of the valve, the sensor being held stationary by the plug; and
  a spring annularly disposed around the guide, wherein a first end of the spring abuts the plug and a second end of the spring abuts the collar of the guide, wherein the spring pushes the guide and the spool away from the plug.

6. The valve of claim 1, wherein the sensor is a Hall effect sensor.

7. The valve of claim 4, wherein the spool has a longitudinal blind hole at one end, a portion of the guide being disposed within the longitudinal blind hole, wherein the guide has a collar that is disposed outside of the longitudinal blind hole and contacts an end of the spool, the valve further comprising:
  a plug disposed at an end of the valve, the sensor being held stationary by the plug; and
  a spring annularly disposed around the guide, wherein a first end of the spring abuts the plug and a second end of the spring abuts the collar of the guide, wherein the spring pushes the guide and the spool away from the plug.

8. A valve comprising:
  a generally cylindrical cage having a first end, a second end, a longitudinal hole extending from the first end to the second end of the cage, a first set of radial holes, and a second set of radial holes;
  a generally cylindrical adaptor having a first end, a second end, and a longitudinal hole extending from the first end to the second end of the adaptor, wherein the first end of the cage is attached to the second end of the adaptor;
  a spool slideably disposed within the longitudinal hole of the cage, the spool having a first position that prevents the first and second sets of radial holes from communicating with one another, and a second position that permits the first and second sets of radial holes to communicate with one another;
  a plug disposed within the longitudinal hole at the first end of the adaptor so as to block the longitudinal hole of the adaptor, the plug having a longitudinal blind hole whose entrance faces toward the spool;
  a sensing means disposed within the plug;
  a generally cylindrical guide slideably disposed within the longitudinal hole of the adaptor near the second end of the adaptor, the guide having a first end and a second end, a longitudinal hole extending from the first end of the guide to the second end of the guide, the first end of the guide being opposite the plug, and second end of the guide abutting the spool;
  a first biasing means disposed within the longitudinal hole of the guide, the first bias means having a first end and a second end, the second end abutting the spool;
  a pin having a first end and a second end, the first end being disposed so as to move freely within the longitudinal blind hole of the plug, the second end being disposed in the longitudinal hole of the guide, the second end abutting the first biasing means; and
  a second biasing means disposed between the plug and the guide so as to push the guide away from the plug.

9. The valve of claim 8, wherein the sensing means is a Hall effect sensor.

10. The valve of claim 8, wherein the first biasing means is a spring.

11. The valve of claim 8, wherein the second biasing means is a spring.

12. The valve of claim 8, wherein the sensing means is a magnetically reactive sensor.

13. A method for determining the state of a hydraulic valve, the hydraulic valve having a spool that is disposed within the valve and movable along an axis of the valve, the method comprising:
  introducing a fluid into the valve to exert a force on the spool and thereby move the spool;
  transmitting the force from the spool to a pin, thereby causing the pin to move;
  generating an electrical signal based on a change in a magnetic field caused by the movement of the pin; and
  deducing, from the electrical signal, the position of the spool;
  wherein the transmitting step comprises transmitting the force from the spool to a biasing means, the biasing means being disposed between the spool and the pin.

14. The method of claim 13, wherein spool has at least a neutral position, wherein the deducing step comprises deducing, from the electrical signal, whether or not the spool is in its neutral position.

15. The method of claim 13, wherein spool has at least a shifted position, wherein the deducing step comprises deducing, from the electrical signal, whether or not the spool is in its shifted position.

16. The method of claim 13, further comprising, preventing a hydraulic device from being activated or performing a certain function based on the deducing step.

* * * * *